United States Patent
Meyer et al.

(10) Patent No.: US 8,223,881 B2
(45) Date of Patent: Jul. 17, 2012

(54) TRANSMITTER AND RECEIVER FOR A WIRELESS AUDIO TRANSMISSION SYSTEM

(75) Inventors: Rolf Meyer, Wenningsen (DE); Juergen Peissig, Hannover (DE); Gerrit Buhe, Wedemark (DE)

(73) Assignee: Sennheiser electronic GmbH & Co. KG, Wedemark (DE)

( * ) Notice: Subject to any disclaimer, the term of this patent is extended or adjusted under 35 U.S.C. 154(b) by 1019 days.

(21) Appl. No.: 11/666,595

(22) PCT Filed: Oct. 27, 2005

(86) PCT No.: PCT/EP2005/011495
§ 371 (c)(1),
(2), (4) Date: Jul. 10, 2007

(87) PCT Pub. No.: WO2006/045605
PCT Pub. Date: May 4, 2006

(65) Prior Publication Data
US 2009/0046803 A1  Feb. 19, 2009

(30) Foreign Application Priority Data
Oct. 27, 2004  (DE) .......................... 10 2004 052 296

(51) Int. Cl.
*H04L 27/00* (2006.01)
*H04N 7/00* (2011.01)
*H04B 1/00* (2006.01)
(52) U.S. Cl. ............................ 375/295; 348/485; 455/72
(58) Field of Classification Search .................. 375/295; 348/485
See application file for complete search history.

(56) References Cited

U.S. PATENT DOCUMENTS
3,510,597 A * 5/1970 Williamson .................. 704/205
(Continued)

FOREIGN PATENT DOCUMENTS
CN   1402436 A   3/2003
(Continued)

OTHER PUBLICATIONS
XP-000856516 MD Computing, Springer, New York, NY vol. 14, No. 4, 1997 pp. 306-317 "The mathematical Theory of Communication" Claude E. Shannon.
(Continued)

*Primary Examiner* — David C. Payne
*Assistant Examiner* — Sarah Hassan
(74) *Attorney, Agent, or Firm* — Frommer Lawrence & Haug LLP

(57) ABSTRACT

There is provided a transmitter for a wireless audio transmission system comprising at least one analog/digital converter unit for analog/digital conversion of the analog audio signals to be transmitted, at least one digital signal processing unit with a compressing/encoding device for compressing and encoding the digitized signal to be transmitted, a digital/analog converter unit for digital/analog conversion of the digital output signals of the digital signal processing unit into analog signals, and a transmitting unit for wirelessly transmitting the output signals of the digital/analog converter unit. There is further provided a receiver for a wireless audio transmission system comprising a receiving unit for receiving wirelessly transmitted analog HF signals, an intermediate frequency unit for mixing the HF signals onto intermediate frequency signals, at least one analog/digital converter unit for analog/digital conversion of the wirelessly received signals, at least one digital signal processing unit with an expanding/decoding device for expanding and decoding the signals digitised by the at least one analog/digital converter unit, and at least one digital/analog converter unit for converting the digital output signals of the digital signal processing unit into analog signals.

10 Claims, 8 Drawing Sheets

U.S. PATENT DOCUMENTS

| | | | |
|---|---|---|---|
| 3,846,719 A | | 11/1974 | Dolby |
| 4,701,722 A | * | 10/1987 | Dolby .............................. 333/14 |
| 5,109,417 A | * | 4/1992 | Fielder et al. ................. 704/205 |
| 5,222,250 A | | 6/1993 | Cleveland et al. |
| 5,583,967 A | * | 12/1996 | Akagiri ...................... 704/200.1 |
| 5,845,216 A | | 12/1998 | Dutkiewicz |
| 6,037,993 A | * | 3/2000 | Easley .......................... 348/485 |
| 6,219,559 B1 | | 4/2001 | Hill et al. |
| 6,317,613 B1 | | 11/2001 | Brown, Jr. |
| 6,359,897 B1 | * | 3/2002 | Hessel et al. ................. 370/429 |
| 6,615,025 B1 | * | 9/2003 | Lee ................................. 455/72 |
| 2001/0034214 A1 | | 10/2001 | Koike |
| 2001/0041548 A1 | * | 11/2001 | Bult et al. .................. 455/252.1 |
| 2004/0158458 A1 | | 8/2004 | Sluijter et al. |

FOREIGN PATENT DOCUMENTS

| | | |
|---|---|---|
| DE | 36 21 513 | 1/1988 |
| DE | 41 30 045 | 3/1993 |
| DE | 697 23 959 | 6/2004 |
| GB | 2 154 100 A | 8/1985 |
| JP | 2000-323997 | 11/2000 |
| JP | 2001-189668 | 7/2001 |
| JP | 2001-217736 | 8/2001 |
| JP | 2002-135156 | 5/2002 |
| JP | 2002359656 | 12/2002 |
| JP | 2003-009278 | 1/2003 |
| JP | 2004242221 | 8/2004 |

OTHER PUBLICATIONS

XP-002367087 CRC Press, Florida, 1997, pp. 224-226, The Communication Handbook "Information Theory / 18.1 and 18.2" Bixio Rimoldi, et al.

XP-002383062 Dolby Laboratories, Inc., 2003, pp. 1-34 "The Introduction to Noise Reduction" Ken Gundry.

"Test of ADC Output Propagation Delay Based on Undersampling Technique", Liao Shujian, Gong Jianping, Li Xunbo, Chen Guangyu, Journal of Scientific Instrument, Supplement of vol. 22, Period 3, pp. 47-48, 2001.

* cited by examiner

Version: Broadband

Version: Multiband

Version: Continuous band

Version: Continuous band

TRANSMITTER AND RECEIVER FOR A WIRELESS AUDIO TRANSMISSION SYSTEM

CROSS-REFERENCE TO RELATED APPLICATIONS

This application claims priority of International Application No. PCT/EP2005/011495, filed Oct. 27, 2005 and German Application No. 10 2004 052 296.0, filed Oct. 27, 2004, the complete disclosures of which are hereby incorporated by reference.

BACKGROUND OF THE INVENTION a) Field of the Invention

The invention concerns a receiver and a transmitter for a wireless transmission system.

b) Description of the Related Art

In the case of wireless audio transmission systems such as for example wireless microphones, in-ear monitors and chin strap headphones, there has in the meantime been a change over to embodying transmission systems of that kind with analog and digital functional units, that is to say on a hybrid basis. In particular relatively simple but robust analog FM transmission of the audio signals is combined with the advantages of digital signal processing. In the case of a conventional approach for a hybrid transmission system such as for example a hybrid microphone an inputted analog signal is digitized by an analog/digital converter and fed to a digital signal processing unit where the digitized signal is suitably processed and then converted back into analog signals again by a digital/analog converter. The converted analog signals are transmitted by an analog wireless FM transmission section and received by a suitable receiver. In the receiver the analog FM signal is digitized again and the original digital audio signal is reconstructed by means of a further digital signal processing unit. To improve or control the transmission a pilot tone is added to the digitized audio signal in the digital signal processing unit of the transmitter, serving to control the muting circuit (squelch) of the receiver. Accordingly the pilot tone and the coded audio signal are transmitted jointly by way of the wireless FM transmission section.

As general state of the arts attention should be directed to the documents DE 36 21 513 C2, DE 41 30 045 A1, DE 697 23 959 T2, U.S. Pat. No. 5,845,216 A, U.S. Pat. No. 5,222,250 A, U.S. Pat. No. 6,317,613 B1 and U.S. Pat. No. 6,219,559 B1.

OBJECT AND SUMMARY OF THE INVENTION

The primary object of the present invention is to provide an improved wireless audio transmission system.

That object is attained, in accordance with the invention, by a transmitter for a wireless audio transmission system comprising at least one analog/digital converter unit for analog/digital conversion of the analog audio signals to be transmitted; at least one digital signal processing unit with a compressing/encoding means for compresssing and encoding the digitized signal to be transmitted; a digital/analog converter unit for digital/analog conversion of the digital output signals of the digital signal processing unit into analog signals; and a transmitting unit for wirelessly transmitting the output signals of the digital/analog converter unit.

The object is also attained, in accordance with the invention, by a receiver for a wireless audio transmission system comprising: a receiving unit for receiving wirelessly transmitted analog HF signals; an intermediate frequency unit for mixing the HF signals onto intermediate frequency signals; an analog/digital converter unit for digital/analog conversion of the wirelessly received signal; a digital signal processing unit with an expanding/decoding means for expanding and decoding the signals digitized by the digital/analog converter unit; and at least one digital/analog converter unit for converting the digital output signals of the digital signal processing unit into analog signals.

The object is further attained, in accordance with the invention, by a wireless audio transmission system having a transmitter and receiver as described above.

Thus there is provided a transmitter for a wireless audio transmission system comprising at least one analog/digital converter unit for analog/digital conversion of the analog audio signals to be transmitted, at least one digital signal processing unit with a compressing/encoding means for compressing and encoding the digitized signal to be transmitted, a digital/analog converter unit for digital/analog conversion of the digital output signals of the digital signal processing unit into analog signals, and a transmitting unit for wirelessly transmitting the output signals of the digital/analog converter unit.

There is further provided a receiver for a wireless audio transmission system comprising a receiver unit for receiving wirelessly transmitted analog HF signals, an intermediate frequency unit for mixing the HF signals onto intermediate frequency signals, at least one analog/digital converter unit for analog/digital conversion of the wirelessly received signals, at least one digital signal processing unit with an expanding/decoding means for expanding and decoding the signals digitized by the at least one analog/digital converter unit, and at least one digital/analog converter unit for converting the digital output signals of the digital signal processing unit into analog signals.

The present invention is described in detail hereinafter with reference to the accompanying drawings:

DESCRIPTION OF THE PREFERRED EMBODIMENTS

Figure 1:
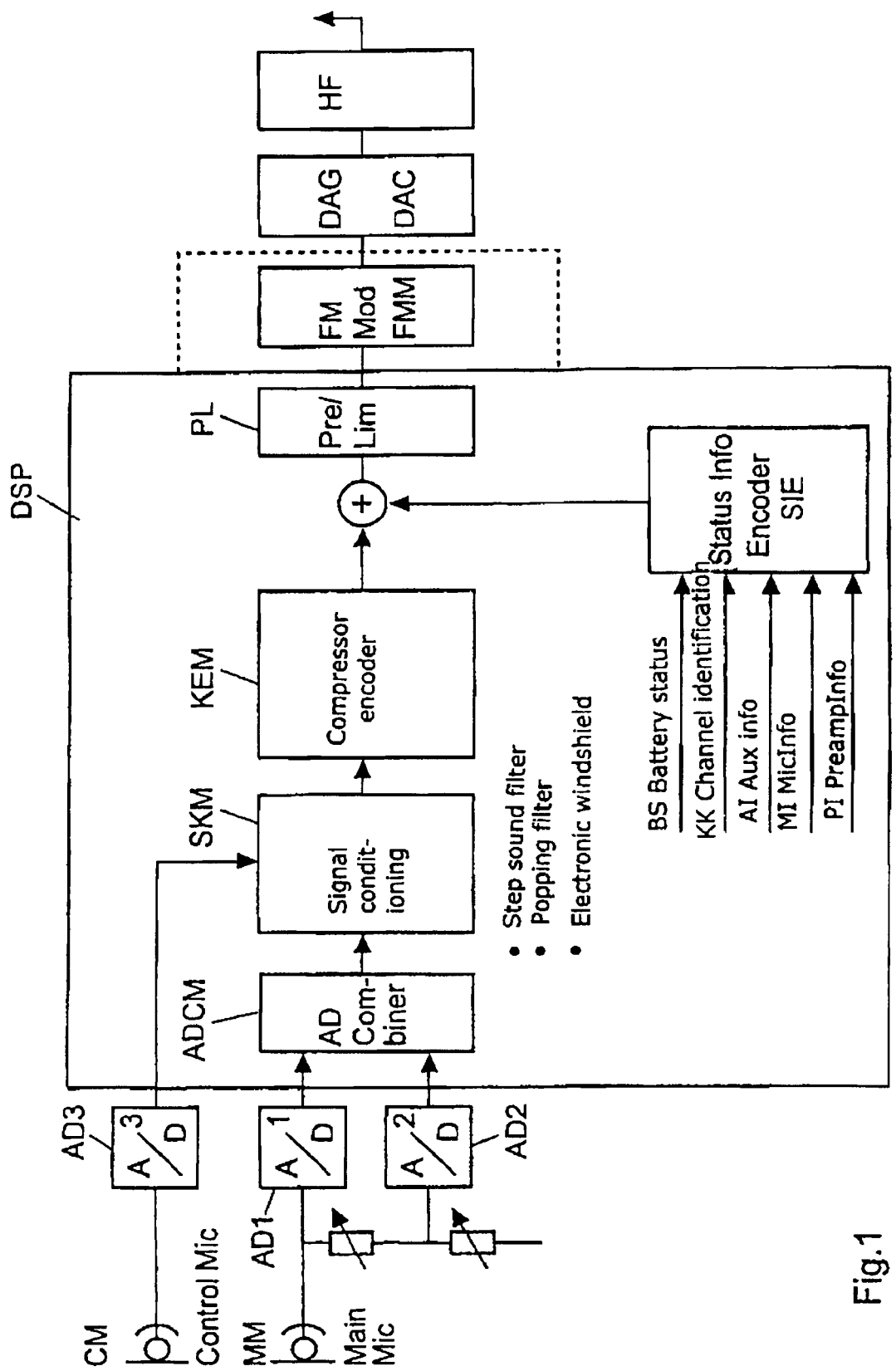
FIG. 1 shows a block diagram of a transmitter according to the present invention.

FIG. 1 shows a block diagram of a transmission in a digital wireless audio transmission system in accordance with a first embodiment of the invention. The transmitter has three analog/digital converters AD1 to AD3, a digital signal processing unit DSP_S, an FM modulation means FMM, a digital/analog converter DAC and an HF transmitting unit HF. Connected to the transmitter is an external main microphone MM and an external control microphone CM. More precisely the audio signals from the main microphone MM are digitized by the first and second analog/digital converter AD1, AD2 and the audio signal of the control microphone CM is digitized by the third analog/digital converter AD3. The digital signal processing unit DSP_S has an analog/digital combining means ADCM, a signal conditioning means SKM, a compressor/encoder means KEM, a status information encoder SIE and a pre-emphasis/limiter means PL. Optionally the FM modulation of the FM modulator means FMM can also be implemented within the digital signal processing unit DSP_S.

The analog audio signals recorded by the control microphone CM are digitized by the third analog/digital converter AD3. The analog/digital combining means ADCM is used to combine the output signals of the first and second analog/digital converters AD1, AD2 in order to obtain a signal-noise ratio which goes beyond the individual converter. The output signals of the analog/digital combining means ADCM and the third analog/digital converter AD3 are inputted in the signal conditioning means SKM in order to implement suitable signal conditioning. More precisely the signal conditioning means SKM serves to eliminate step, sound and popping noises. It is also possible to influence the tone of the digitized audio signals in order to compensate for properties of the capsule in the two microphones MM, CM.

The compressor/encoder means KEM represents the encoder portion of a digital compander. The digital implementation of the compander permits complete reciprocity of the signal processing units (weighting filters, filter banks, envelope determination, time constants) of encoder and decoder (in the corresponding receiver in the wireless transmission system). Implementation of short-time frequency analysis processes is also possible.

The status information encoder SIE serves to integrate items of status information such as for example the battery status BS, channel identification KK, items of auxiliary information AI, items of microphone information MI and/or items of pre-amplification information PI which are to be transmitted from the transmitter to the receiver in FM transmission in the baseband or in the enlarged audio band (20 Hz to 56 kHz). Those items of digital information are encoded in the transmitter by means of the status information encoder SIE and later decoded in the receiver. In particular the digital status information to be transmitted is adapted to the existing FM channel. Furthermore different pilot tones can be produced for different channels. The items of digital information can be encoded for example in the amplitude and/or the phase of the pilot tones. The audio signal encoded by the digital compressor means KEM is combined with the status information signal (for example pilot tone) from the status information encoder SIE and the combined LF signal is adapted to the channel by pre-emphasis and by a limiter. The limiter PL serves to limit the bandwidth of the FM signal. Optionally, that is to say if there is both sufficient current and also sufficient processor power available, FM modulation by the FM modulator means can also be implemented in the digital region, which can lead to an improved signal-noise ratio (S/N) and improved linearity.

Figure 2:
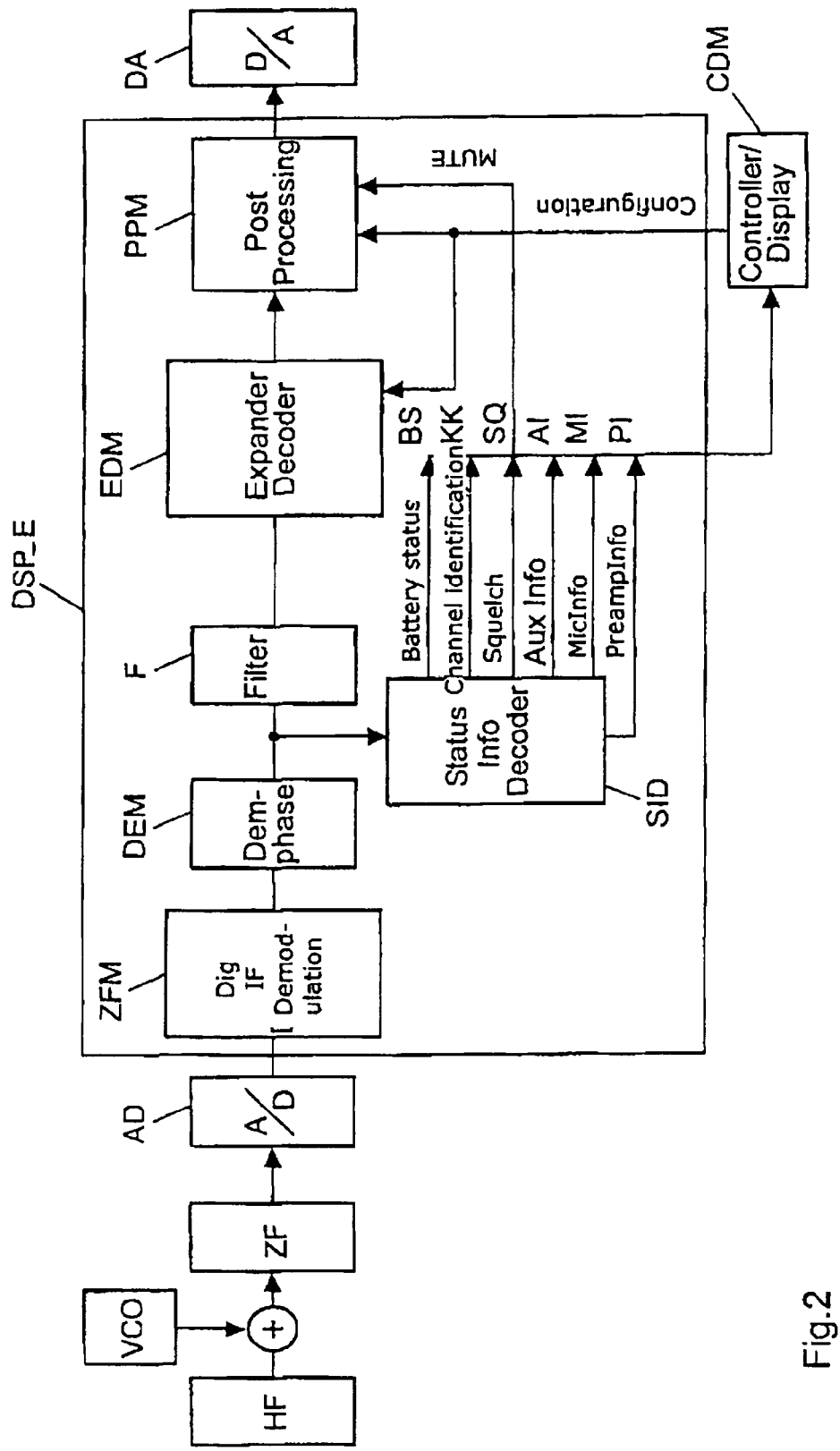
FIG. 2 shows a block diagram of a receiver according to the present invention.

FIG. 2 shows a block diagram of a receiver in accordance with the present invention. The receiver of FIG. 2 serves to receive the wireless signals communicated from the transmitter of FIG. 1. The receiver has an HF receiving unit HF, an oscillator OSC, an intermediate frequency unit IF, an analog/digital converter AD, a digital signal processing unit DSP_E, a digital/analog converter DA and a control/display unit CDM. The output of the HF unit is mixed onto an intermediate frequency IF and analog/digital conversion is implemented in the analog/digital converter AD. That analog/digital conversion is effected with a suitable sampling rate which makes it possible to produce the image of the complete FM spectrum in the digital range. It can be effected both by undersampling and also oversampling. The digital signal processing unit DSP_E has a digital IF demodulation means IFM, a de-emphasis means DEM, a filter F, a status information decoder SID, an expander/decoder EDM and a post-processing means PPM.

The LF signal is outputted at the output of the IF demodulation means IFM so that a de-emphasis operation can be carried out in the de-emphasis means DEM. The output of the de-emphasis means DEM is passed both to the filter F and also to the status information decoder SID. The items of status information are analysed by the status information decoder SID and divided into the corresponding individual items of information, for example battery status BS, channel identification KK, squelch SQ, Aux information AI, microphone information MI and pre-amplification information PI. Those items of information are passed to the control/display means CDM which sets a suitable configuration in respect of the expander/decoder EDM and the post-processing means PPM. In addition the squelch information SQ relating to the muting circuit is passed to the post-processing means PPM. More precisely, a squelch criterion relating to the muting circuit can be produced in channel-specific fashion from the presence of a pilot tone and the impressed digital information.

The signal which has been cleared of the status information signal by the filter F is passed to the expander/decoder DEM for expansion of the signal and the output signal of the expander/decoder EDM is passed to the audio/post-processing operations for avoiding unwanted audio signal properties. Those properties can be switched on and can be configured by way of the input of the control unit CDM. Examples of those functions which can be switched on are a muting circuit, linear filtering, sibilance reduction (de-essing), audio compression and brilliance amplification (exciter).

The advantage of digital implementation of the functionalities by a digital signal processing unit, for example by a digital signal processor DSP, lies substantially in an improved transmission property, a saving in terms of costs, space and calibration procedures. In addition adverse effects of component ageing of the analog elements is reduced thereby and reprogrammable functions are produced. Those functions can be embodied in chip-independent fashion and further functions can be embodied, which cannot be readily implemented on an analog basis.

Thus the digital IF, baseband and LF functional units, that is to say modulation/demodulation, audio compression/expansion, the encoder/decoder of status information and audio pre-/post-processing are implemented in digital units. That provides for programmability and thus control of the transmission properties by the signal being transmitted and detection of the transmitter configuration and thus indirectly adaptation of the receiver to the transmitter. That is proven to be advantageous in particular to the effect that it provides for an enlargement of the audio dynamic range of analog dynamic-reduced transmission paths. The linearity of transmission is also improved, compander artefacts and the complexity of the hardware is also reduced. The necessary compensating complication and expenditure during production and also after ageing in particular of the analog components is reduced, free configuratability of the control functions and the LF transmission properties as well as comfortable configuration (in particular automatically) of the transmitting/receiving paths in respect of the HF and audio transmission properties is now a possibility.

Thus for example the analog/digital converter in the transmitter can be operated in the LF range of 20 Hz to 20 (40) kHz with a sampling rate Fs=48/96 kHz, audio pre-processing, pre-emphasis, a "rumble filter"; a compressor/encoder, status/control signal production (pilot tone, status information production and encoding), a combination of audio signals and control signals, a channel filter (pre-emphasis) as well as a modulator and optionally a first intermediate frequency IF are implemented. In the receiver a high-sampling AD-converter/comparator (with a sampling rate Fs of some hundred kilohertz to some megahertz), a demodulator, a channel filter, extraction of status/control signals, an expander/decoder, audio pre-processing and a digital/analog converter with a sampling rate of Fs=48/96 kHz is implemented.

Set forth hereinafter is an implementation option of a receiver shown in FIG. 2, wherein the demodulator in the receiver is already implemented digitally, which entails the substantial advantage of enhanced linearity of demodulation as well as the saving on RSSI, limiter and the second mixer. Instead of a relatively complex demodulator IC therefore only a simple mixer is still necessary for conversion of the first to the second intermediate frequency IF. In addition a reduction in the selection demands of the SAW filters is possible, which as a result can be embodied with a lower harmonic distortion factor.

In the conventional approach for example for a hybrid microphone in the second intermediate frequency (mostly 10.7 MHz) selection is increased once again with ceramic filters and then demodulation is effected. An AD converter (analog/digital converter) samples the analog audio signal present in order to apply the expander algorithm to the data sequence which is now digital. If however the AD converter is already put into the intermediate frequency IF it is then already possible to achieve down-mixing and even perfect quadrature demodulation by a clever choice of the sampling rate by the sampling process itself. In that case the sampling rate of the converter must not be matched to the level of the IF but solely the baseband bandwidth, which for the audio transducer which is otherwise used constitutes approximately a factor of 5 . . . 10 (480 kHz/96 kHz . . . 480 kHz/48 kHz). It will be noted however that in addition there are two further requirements. On the one hand—as already indicated—the sampling rate must be in a given relationship with the IF and on the other hand the analog input bandwidth (quality of the sample-and-hold member) must comply with the intermediate frequency.

Figure 3:
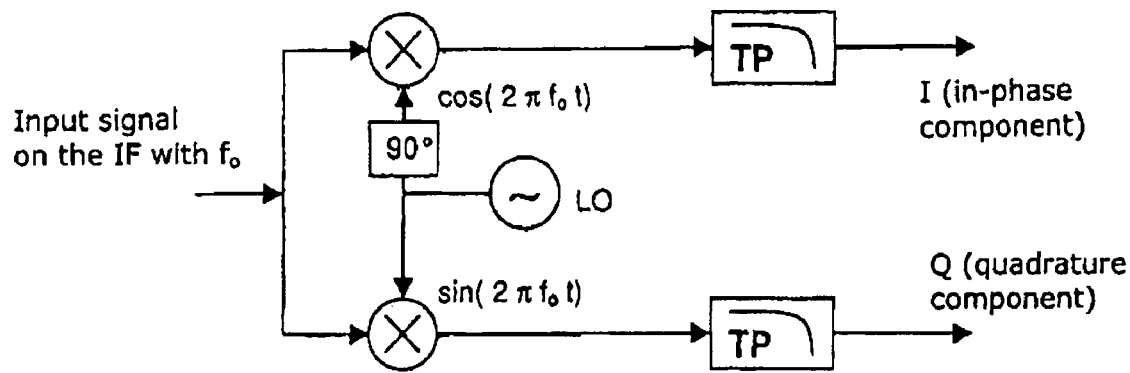
FIG. 3 shows a block diagram of a conventional analog quadrature demodulator.

FIG. 3 shows a block diagram of a conventional analog quadrature demodulator. The input signal at the intermediate frequency IF is passed to the two mixers and mixed with the oscillator signal of the LO (local oscillator). The following low pass filters TP respectively suppress the sum mixed product so that only the baseband (centre frequency=0) for I and Q occurs at the output. FM demodulation is then effected from the complex signal I+j*Q.

As the analog implementation of that arrangement of FIG. 3 does not represent a simple alternative to previous FM demodulation the AD converter is already put into the range of the intermediate frequency. The mixers now become digital multipliers and the two LO signals become the numerical cosine and sine data stream. Accordingly from
$\cos(2\pi f_0 t)$ that gives $$\cos\left(2\pi \frac{f_0}{f_s} n\right)$$

and
$\sin(2\pi f_0 t)$ becomes $$\sin\left(2\pi \frac{f_0}{f_s} n\right),$$

in each case with $t=nT_s$ and $$T_s = \frac{1}{f_s}.$$

If now the ratio $$\frac{f_0}{f_s}$$

is selected with $$f_s = \frac{4}{k} f_0, \qquad (1)$$

then for the cosine and sine functions that only affords the function values $\{1, 0, -1, 0, \ldots\}$ and $\{0, 1, 0, -1 \ldots\}$ respectively.

Figure 4:
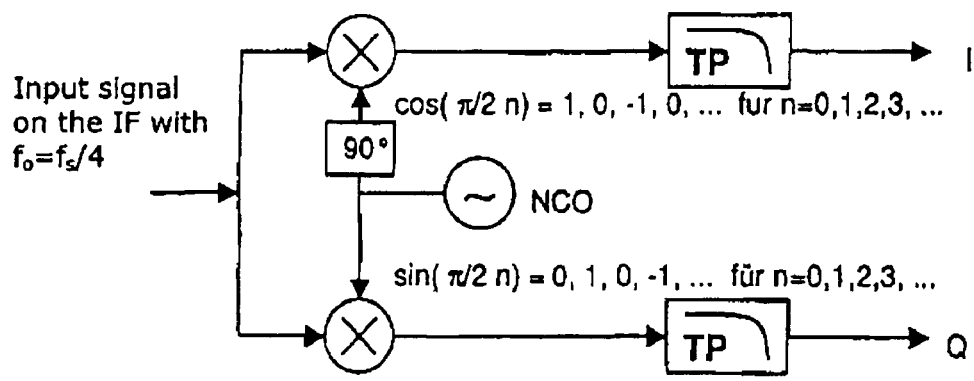
FIG. 4 shows a block diagram of an expense-optimized quadrature demodulator.

FIG. 4 shows a block diagram of the digital quadrature demodulator for the situation:

k=1 therefore $f_s=4f_0$.

It is thus apparent that in both paths only each second sampling value is significant and that the respectively orthogonal component becomes zero. In order to implement the total quadrature demodulation effect therefore only zeros have to be inserted and signs inverted at a given location; that is to say it is possible to completely dispense with a numerical oscillator (NCO) and multiplier. Due to the phase shift of 90° which here makes up precisely one sample value the digital data stream of the AD converter can even be interpreted straightaway as multiplexed from I- and Q-values with which only one zero for the respectively orthogonal signal component still has to be associated:

$I_0, Q_1, -I_2, -Q_3, I_4, Q_5, -I_6, -Q_7, I_8, Q_9, -I_{10}, -Q_{11},$
$I_{12}, Q_{13}, -I_{14}, -Q_{15}, \ldots$ In that respect it is completely immaterial whether the counting begins at a I or Q because the sideband reversal which results in the error situation, in the case of modulation such as for example FM modulation, only leads to a constant phase shift. The start of sign manipulation is also not critical because that only involves displacing the phase position of the LO by 180°, which in turn has no influence on the demodulation of an FM signal.

Figure 5:
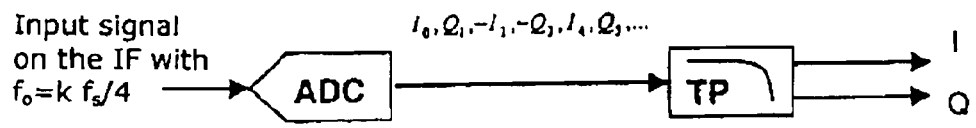
FIG. 5 shows a block diagram of a further quadrature demodulator.

The sign change can be very easily achieved by negation of the corresponding coefficients of the following low pass member or by alternate sign reversal at the accumulator of the filter. As I- and Q-values are never simultaneously unequal to zero, that can even be implemented with only one single filter which has two separate accumulators which are used alternately as shown in FIG. 5. After that filter the sampling rate is decimated to the necessary degree in order to reduce the complexity of the necessary sequential stages.

For the specific case which has just been selected of k=1 or $f_s=4f_0$ the required sampling rate, corresponding to the prevailing intermediate frequency IF of 10.7 MHz, is precisely 42.8 MHz. An AD converter with that clock rate is generally not particularly desirable nor is it satisfied with little current, which represents an important criterion depending on the respective application involved (for example in a battery mode). It will be noted that it is even more undesirable that that clock rate, even for present day DSPs, represents a very high utilization duty which scarcely allows further processing. As stated hereinbefore such a high sampling rate however is not necessary for the sampling theorem does not have to be satisfied for the intermediate frequency IF but exclusively for the useful bandwidth. As that is still effected in the arrangement before the demodulator that useful bandwidth is that of modulation (and not of the demodulated audio signal!). k can be increased as long as the resulting sampling rate satisfies the condition $$f_s \geq 2B_{BB}, \text{ with } B_{BB} \text{ as the baseband bandwidth at one side.} \quad (2)$$

$f_s$ should preferably be selected to be a little higher so that baseband filtering does not require an excessively high level of complication and expenditure (number of necessary multiplication steps in the DSP). With the undersampling which is implemented by the correspondingly low sampling rate, the aliasing effect which occurs can be quite deliberately used. If the sampling rate is set in an integral relationship with the intermediate frequency IF, the signal which is modulated onto the IF is mixed directly in the sampling process into the zero position. The condition to be satisfied therefore reads as follows:

$$f_s = \frac{f_0}{m} \text{ with } m \in G, \quad (3)$$

wherein $G$ is the range of whole numbers.

In the case of undersampling the components of all integral multiples of the sampling frequency are folded into the baseband so that selection of the alias image which is the only one of interest must be effected around 10.7 MHz. That is already effected by the preceding IF filters which only allow the region around 10.7 MHz to pass undamped. Preferably the AD converter should not have any installed anti-aliasing filters but must be undersampling-capable. In such cases the analog input bandwidth is a multiple higher than the possible sampling rate and depends on the quality of the sample-and-hold member (weighting sinc function in the spectrum). In addition sampling uncertainty (aperture jitter) decides about the useable dynamics in relation to high-frequency input signals. Limitation of the signal-noise ratio (SNR) can be calculated as follows:

$$SNR_{dB} = 20\log_{10}\left(\frac{1}{2\pi f_{in} t_j}\right), \quad (4)$$

in which $t_j$ is the quadratic mean value of the clock jitter.

If the received modulated signal such as for example the FM signal is to be obtained in a complication-optimized fashion by undersampling from the intermediate frequency and at the same time quadrature demodulation is to be implemented without NCO and multiplier the following requirement arises out of equations (1), (2) and (3):

$$\frac{k}{m} = 4 \text{ wherein } m \text{ must be } \leq \frac{f_0}{2B_{BB}} \quad (5)$$

with $k = 1, 3, 5, \ldots$ and $m \in G$.

No solution exists under the given conditions because an odd k divided by 4 can never give a whole number m. Perfect orthogonal quadrature demodulation and downward mixing to 0 Hertz, involved with the sampling, will not be capable of being implemented at the same time, but only ever one of the two.

Instead of mixing equal to f=0, k can be so selected that the useful signal due to the undersampling is put onto an additional, much lower intermediate frequency IF in the digital range ($f_{od}$). In that case however it must be noted that the sampling theorem must be fulfilled for both sidebands. For that situation therefore the following applies as a new requirement:

$$f_s \geq 4B_{BB} \text{ and in addition} \quad (6)$$

$$\frac{f_s}{2} \geq f_{od} \geq B_{BB}, \quad (7)$$

with $B_{BB}$ as baseband bandwidth at one side.

For an IF of for example $f_0=10.7$ MHz, the parameters are as follows, with k=81 and m=20:

$f_s$=528.395 kHz $f_{od=f0-mfs}$=132.099 kHz.

Figure 6:
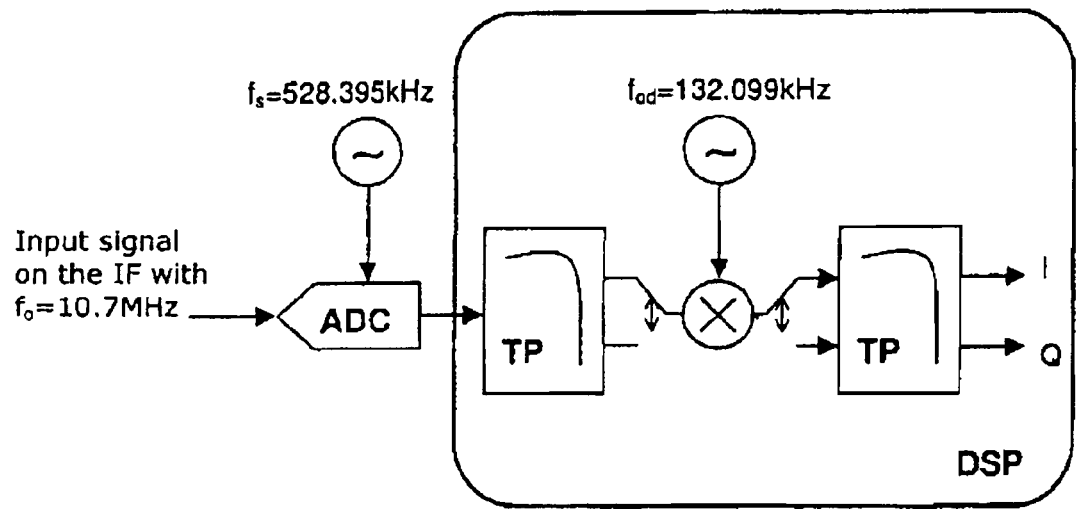
FIG. 6 shows a block diagram of the overall arrangement of the quadrature demodulator.

FIG. 6 shows a block diagram of a digital quadrature modulator. In this case there is an AD converter ADC in the intermediate frequency, which supplies a multiplexed I/Q data stream to a digital signal processing unit DSP which, by virtue of the relatively low data rate, has sufficient time for signal processing. A part of that is required in order to mix the I- and Q-signals of the digital intermediate frequency $f_{od}$ down into a zero position. In that case the digital intermediate frequency $f_{od}$ corresponds to the input signal of the intermediate frequency minus m* of the sampling rate of the AD converter ADC ($f_{od}=f_0-mf_s$). A suitable choice of the parameters k, m makes it possible to ensure that the modulation bandwidth is at a maximum 100 kHz (on one side) (in accordance with the ETSI standard). That can be effected by multiplication with a cosine of the digital intermediate frequency, or however efficiently with the CORDIC algorithm which implements that task with bit shifts and additions. In general terms in the case of undersampling from even Nyquist zones a sideband reversal is to be observed, which here in FM causes a constant phase shift.

The second low pass member can be very efficiently embodied in the form of a so-called half-band filter, wherein the limit frequency corresponds to half the Nyquist rate, whereby each second coefficient becomes zero. Accordingly multiplexing of I and Q is possible, utilising two accumulators. Decimation of the sampling rate can also be effected as only the sampling theorem for the baseband bandwidth at one side still has to be satisfied, which subsequently permits more complex signal processing. It is to be emphasized that, in spite of the processing of two signal components (I and Q), it is at no point necessary to execute more than $f_s$ multiplication operations.

The two low pass filters increase channel selection so that the demands in that respect on the analog IF filters can under some circumstances be reduced to the benefit of a lower harmonic distortion factor. In that respect however it is to be noted that the dynamics of the AD converter in the intermediate frequency IF must allow linear conversion of useful and interference signals. Desensitization by a possibly upstream-connected automatic gain control AGC cannot be reversed again. That means that each dB of lesser selection requires one dB more of AD converter dynamics. If for cost reasons there is no wish to use IF filters which are optimized in terms of phase linearity (custom parts) it is possible to use as hitherto an analog limiter upstream of the AD converter, which greatly reduces the dynamic demands so that it is possible to operate completely without AGC and with a simpler converter. Optionally sampling can even be effected with only one bit resolution, that is to say it can be implemented with a comparator.

Figure 7:
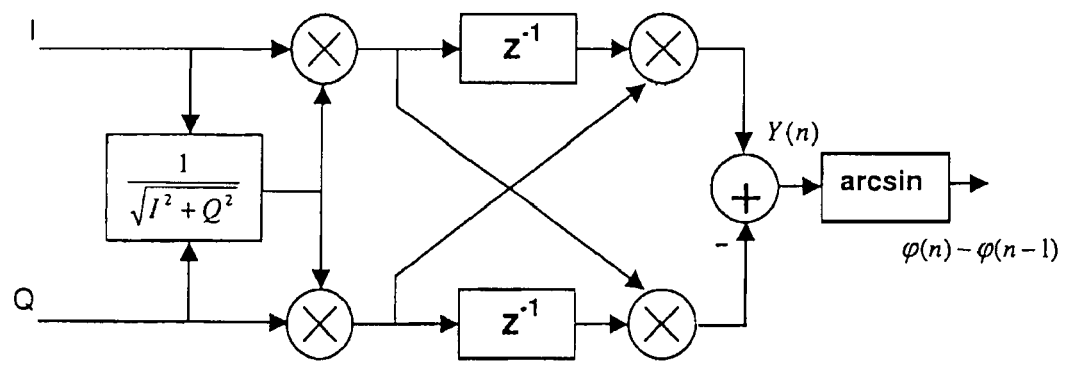
FIG. 7 shows a block diagram of digital FM demodulation.

The essential advantage of digital FM demodulation compared with analog demodulation is the much higher level of linearity linked to the freedom from compensation as well as lack of ageing. The harmonic distortion factor of such a demodulator is therefore substantially less and the dynamics are determined only by the word width of signal processing. If an analog limiter has not effected AM suppression upstream of the AD converter as in the case of conventional solutions that is now effected by division by the amount as shown in FIG. 7. The following multiplication network forms the output signal:

$$Y(n)=Q(n)I(n-1)-I(n)Q(n-1)=\sin(\varphi(n)-\varphi(n-1)) \quad (8)$$

After the reversal of the sine function therefore that provides the phase difference per unit of time, which corresponds to the prevailing modulation frequency:

$$f_m = \frac{\varphi(n)-\varphi(n-1)}{T_s} \text{ with } T_s = \frac{1}{f_s}. \quad (9)$$

Figure 8:
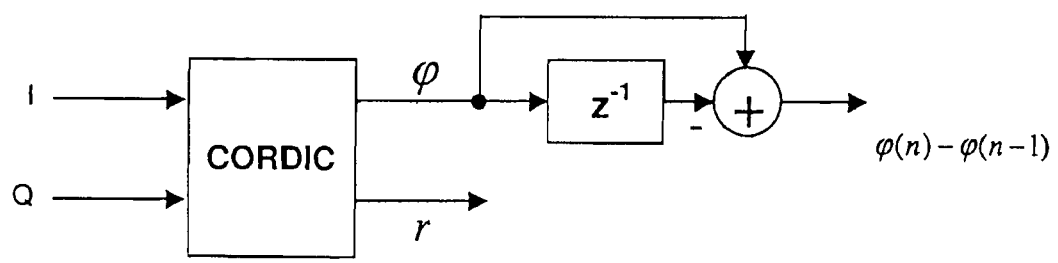
FIG. 8 shows a block diagram of a further digital FM demodulation.

What is even easier to implement digitally is conversion of the Cartesian co-ordinates (I, Q) into polar co-ordinates (r, φ) by means of the CORDIC algorithm (uses only bit shifts and additions) in order to determine the instantaneous modulation frequency from the phase values φ by simple subtraction. AM suppression is effected virtually by ignoring the amplitude value r as shown in FIG. 8.

Now in a hybrid microphone there directly follows in the DSP, besides deriving various squelch criteria (noise power, pilot tone), filtering and evaluation of the battery telegram, reversal of possibly implemented pre-emphasis and naturally the expander.

The DSP used in a hybrid microphone receiver for the expanding step can also be used for expenditure-optimized processing of the intermediate frequency and fully digitally implemented FM demodulation. In comparison with analog implementation the latter provides substantially enhanced linearity and complete freedom from compensation.

Although the principles of the invention have been described hereinbefore for FM modulation and FM demodulation the principles of the invention can also be applied to other modulation/demodulation procedures.

The above-specified numerical examples serve only to illustrate the underlying mode of operation of the invention. The mode of operation of the invention can also be implemented with other numerical examples.

Figure 9:
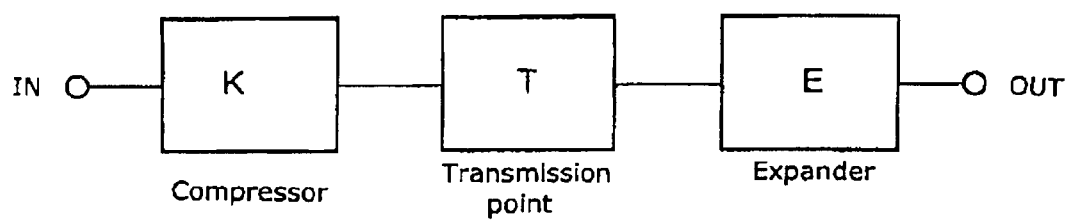
FIG. 9 shows a schematic block diagram of a wireless digital audio transmission system.

FIG. 9 shows a schematic block diagram of a wireless digital audio transmission system in accordance with a second embodiment. The input signals IN to be transmitted are fed to the compressor unit K which compresses the input signals IN which are then transmitted by way of the transmission section T. An expander unit E receives the transmitted compressed signals and effects expansion of the signals and then outputs the signals as an output signal OUT. The transmission section preferably represents a wireless transmission section.

The digital compander in accordance with the second embodiment comprises a compressor unit K in a transmitter and a reciprocally operating expander unit E in a receiver. The digital compander in accordance with the second embodiment is implemented in the form of a multiband compander, that is to say an input signal is divided into various bands.

Figure 10A:
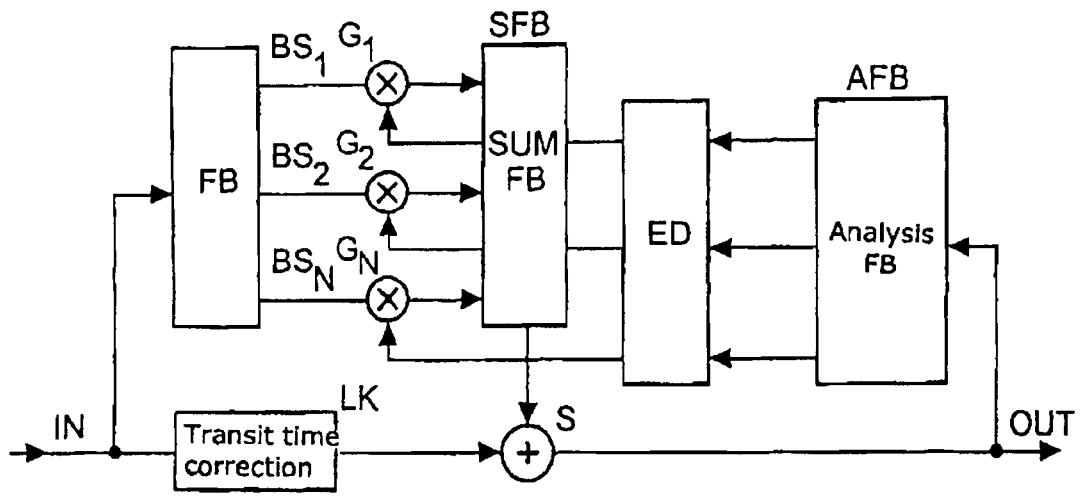
FIG. 10a shows a block diagram of a digital compressor in accordance with a first embodiment.

FIG. 10a shows a block circuit diagram of a compressor according to the second embodiment. The compressor has a filter bank FB with a plurality of outputs $BS_1$-$BS_N$, a plurality of multiplier units $G_1$-$G_N$, a sum filter bank SFB, an envelope detection unit ED, a filter bank analysis unit AFB, a transit time correction unit LK and a summing unit S. A signal IN to be transmitted is passed both to the transit time correction unit LK and also the filter bank FB. In the filter bank FB the input signal IN is divided into different frequency bands. The respective outputs of the filter banks $BS_1$-$BS_N$ represent real or complex signals, that is to say comprising real and imaginary parts. The outputs of the filter banks $BS_1$-$BS_N$ are respectively fed to the multiplier units $G_1$-$G_N$ in order to multiply them with band-specific real-value weighting factors. The output signals of the multiplier units $G_1$-$G_N$ are respectively passed to the sum filter bank SFB where the complex band signals which have been respectively altered in their value are combined to afford a total signal. That combined signal is added in the summing unit S to the input signal IN. Preferably that input signal IN is subjected to transit time correction in the transit time correction unit LK. In that respect transit time correction is selected in such a way that the transit times which have occurred by virtue of processing of the input signal IN in the filter bank FB, the multiplier units $G_1$-$G_N$ and the sum filter bank SFB are equalized.

The result of addition of the modified signal to the transit time-corrected input signal IN represents compression of the signal dynamics so that the output signal OUT has experienced dynamic compression.

A feedback loop is provided in addition to the above-described implementation. For that purpose the output signal OUT is passed to a filter bank analysis unit AFB. The output signals of the filter bank analysis unit AFB represent real-value or complex-value functions and are passed to the envelope detection unit ED. The envelope detection unit ED involves estimating the envelope of the signal so that with the output signals of the envelope detection unit ED the weight functions can be ascertained, describing a characteristic curve with compression properties. The ascertained weight functions are passed into the multiplier units $G_1$-$G_N$ and thus multiplied by the output signals $BS_1$-$BS_N$. The envelope detection unit ED also serves to impress temporal regulating properties such as for example attack, decay, sustain, release or the like on the weight functions.

Figure 10B:
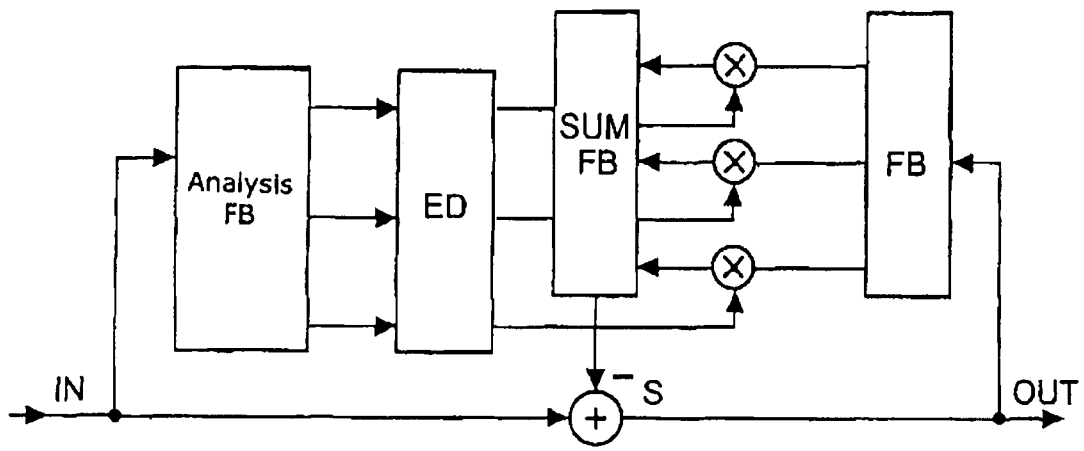
FIG. 10b shows a block diagram of an expander in accordance with a first embodiment.

FIG. 10b shows block diagram of an expander in accordance with the second embodiment. In this case the expander is of a substantially reciprocal structure to the compressor of FIG. 10a. Only a transit time correction unit LK can be omitted. Here the input signal IN represents the signal transmitted by way of the transmission section in FIG. 9. While in the compressor in FIG. 10a the filter bank FB, the multiplier units $G_1$-$G_N$ and the sum filter bank SFB are provided in a forward structure, those units in the expander in FIG. 10b are arranged in the feedback path so that the output signal of the sum filter bank SFB is subtracted from the input signal IN in the summing unit S in order to represent the output signal OUT. the function of the filter bank analysis unit AFB and the envelope detection unit ED corresponds in that case to the function of those units in the compressor of FIG. 10a.

While the digital compander in accordance with the second embodiment of the invention is based on a multiband implementation the digital compander in accordance with the third embodiment of the invention is based on a digital compander with a continuous band.

Figure 11A:
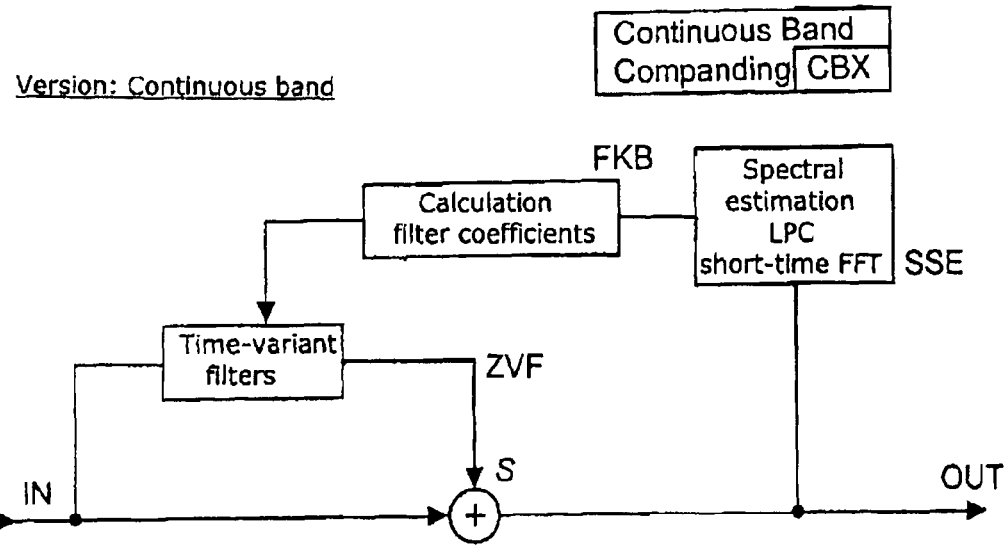
FIG. 11a shows a block diagram of a digital compressor in accordance with a second embodiment.

FIG. 11a shows a block diagram of a compressor in accordance with the third embodiment of the invention. In this case the compressor has a time-variant filter unit ZVF, a filter coefficient calculating unit FKB and a spectral estimation unit SSE. The input signal IN to be transmitted is passed both to the summing unit S and also to the filter unit ZVF. The filter unit ZVF causes time-variant filtering so that the result is a continuous band. The output signal of the filter unit ZVF is added to the input signal IN the summing unit S so that the result is the output signal OUT. The output signal OUT is passed to the spectral estimation unit SSE which effects spectral estimation. Such an estimation operation can be effected for example by an LPC filter or a short-time FFT. The output signal of the estimation unit SSE is fed to the filter coefficient calculating unit FKB. Here calculation of the coefficients for the time-variant filter ZVF is then effected based on the spectral estimation, the compression factor and possibly further time parameters such as for example attack, decay, sustain and release. The prevailing filter coefficients which are ascertained in that way and which represent the desired compression characteristic curve are passed to the time-variant filter ZVF in order to correspondingly influence the input signal IN. Thus the dynamics of the output signal OUT can be correspondingly compressed by influencing the filter coefficients in respect of the dynamics thereof.

Figure 11B:
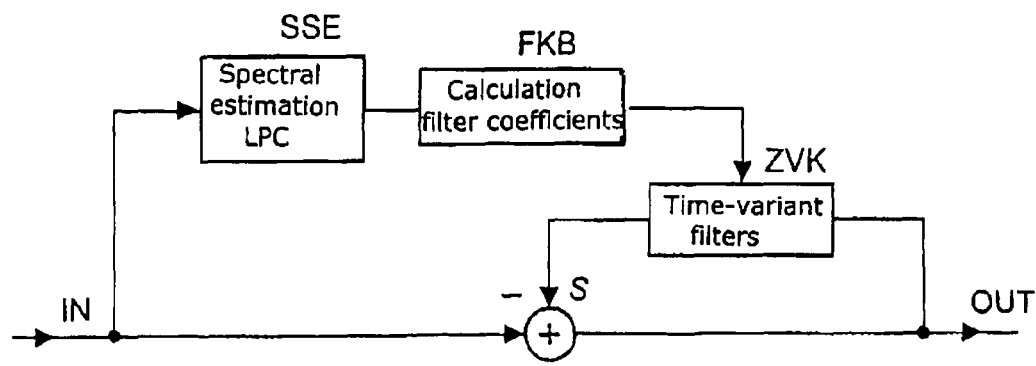
FIG. 11b shows a block diagram of an expander in accordance with a second embodiment.

FIG. 11b shows a block diagram of an expander in accordance with a fourth embodiment of the invention. In this case the expander is of substantially complementary or reciprocal structure to the compressor of FIG. 11a. Thus the expander also has a spectral estimation unit SSE, a filter coefficient calculating unit and a time-variant filter unit ZVF and a summing unit S. In this case the transmitted input signal IN is passed both to the summing unit S and also to the spectral estimation unit SSE. The output signal of the spectral estimation unit SSE is fed to the filter coefficient calculating unit FKB which calculates the corresponding filter coefficients and feeds same to the time-variant filter unit. The output signal OUT is fed to the time-variant filter unit ZVF so that the output signal of the filter unit ZVF is subtracted from the input signal in the summing unit S. Thus the forward and rearward structures are of a reversed configuration between the compander and the expander, as in the first embodiment.

The digital compander in accordance with the second embodiment is similar to the digital compander in accordance with the third embodiment as, upon an increase in the number of bands in the multiband compander in accordance with the second embodiment, that constitutes a transition to a digital compander with a continuous band in accordance with the third embodiment. The compander of the second embodiment differs from the compander of the third embodiment in that the corresponding regulating parameters are ascertained differently and also in a corresponding transfer to the frequency-determined coefficients of the time-variant filter.

As already stated hereinbefore the digital compander comprises a compressor unit in a transmitter and a reciprocally or complementarily operating expander unit in a receiver. Digital implementation of a compander guarantees substantially complete identify of the signal analysis units such as for example weighting filters, filter banks, envelope determination as well as the time constants of the encoder or the compander and decoder or expander respectively. Thus the audio functions in respect of transmission are no longer dependent on component tolerances or ageing phenomena which possibly occur in respect of the corresponding components. Digital implementation of a compander by means of a digital signal processing unit DSP further permits simplified implementation of short-time frequency analysis processes such as for example Fourier transformation and LPC analysis and correspondingly simple implementation of non-linear functionalities.

In accordance with a further embodiment of the invention the filter bank analysis unit AFB or the spectral estimation unit SSE is capable of setting the compander properties in dependence on the detected input signal IN. As an alternative thereto the configuration of the digital compander can be correspondingly manually effected. For that purpose the compander properties can be programmed and selected by way of presets or previously selected settings. That therefore affords compatibility between transmitters and receivers with different digital compander systems.

While in known analog companders the compander was embodied based on a single-band or multiband technology single-band technology suffers from the disadvantage that the entire band or its level is regulated by narrow-band signals. That leads to audible noise flags and undesirable modulation of high-frequency information onto low-frequency signal components or vice-versa. The multiband technology in contrast resolves that problem but it involves a markedly higher level of complication and expenditure in embodying it and compensating for it, in its analog implementation. In addition the time parameters as well as the mode of envelope estimation are fixedly predetermined by the analog circuitry. In addition the compression ratio in the band is fixed. In a digital implementation in contrast those parameters can vary so that analysis of the signal content can control the time parameters and the manner of envelope formation as well as the compression ratio.

The compressor and expander in accordance with the second and third embodiments can each be used as a compressor/encoder means KEM and expander/decoder means EDM in accordance with the first embodiment.

Compression and expansion described in accordance with the second and third embodiments can be used wherever a compander can be employed.

While the foregoing description and drawings represent the present invention, it will be obvious to those skilled in the art that various changes may be made therein without departing from the true spirit and scope of the present invention.

That invention claimed is:

1. A transmitter for a wireless audio transmission system comprising:
   at least one analog/digital converter unit for analog/digital conversion of analog audio signals to be transmitted into a first digitized signal; and
   at least one digital signal processing unit with a compressing/encoding means for compressing and encoding the first digitized signal into a second digitized signal to be transmitted, the compressing/encoding means comprising:
      a filter bank for dividing the first digitized signal into different frequency bands;
      at least one multiplier unit for multiplying the different frequency bands of the first digitized signal by weighting factors;
      a sum filter bank for combining the output signals of the multiplication units to afford a filter bank total signal;
      an addition unit for adding the first digitized signal to the filter bank total signal to obtain the second digitized signal;
      a filter bank analysis unit for analyzing the second digitized signal; and
      an envelope detection unit for estimating the envelope of the second digitized signal based on the analysis of the second digitized signal by the filter bank analysis unit to determine the weighting factors.

2. A receiver for a wireless audio transmission system comprising:
   a digital signal processing unit with an expanding/decoding means for expanding and decoding a received first digitized signal into a second digitized signal, the expanding/decoding means comprising:
      a filter bank for dividing the second digitized signal into different frequency bands;
      at least one multiplier unit for multiplying the different frequency bands of the second digitized signal by weighting factors;
      a sum filter bank for combining the output signals of the multiplication units to afford a filter bank total signal;
      an addition unit for subtracting the filter bank total signal from the first digitized signal to obtain the second digitized signal;
      a filter bank analysis unit for analyzing the first digitized signal; and
      an envelope detection unit for estimating the envelope of the first digitized signal based on the analysis of the first digitized signal by the filter bank analysis unit to determine the weighting factors.

3. A transmitter for a wireless audio transmission system comprising:
   at least one analog/digital converter unit for analog/digital conversion of analog audio signals to be transmitted into a first digitized signal; and
   at least one digital signal processing unit with a compressing/encoding means for compressing and encoding the first digitized signal to be transmitted into a second digitized signal, the compressing/encoding means comprising:
      a time-variant filter unit for time-variant filtering of the first digitized signal;
      an addition unit for adding the output signal of the time-variant filter unit to the first digitized signal to obtain the second digitized signal;
      a spectral estimation unit for carrying out spectral estimation of the second digitized signal; and
      a filter coefficient calculating unit for calculating the coefficients of the time-variant filter unit based on the spectral estimation of the spectral estimation unit.

4. A receiver for a wireless audio transmission system comprising:
   a digital signal processing unit with an expanding/decoding means for expanding and decoding a received first digitized signal into a second digitized signal, the expanding/decoding means comprising:
      a time-variant filter unit for time-variant filtering of the second digitized signal;
      an addition unit for subtracting the output signal of the time-variant filter unit from the first digitized signal to obtain the second digitized signal;
      a spectral estimation unit for carrying out spectral estimation of the first digitized signal; and
      a filter coefficient calculating unit for calculating the coefficients of the time-variant filter unit based on the spectral estimation of the spectral estimation unit.

5. The transmitter according to claim 1, further comprising:
   a transit time correction unit configured to subject the first digitized signal to transit time correction before reaching the addition unit.

6. The transmitter according to claim 1, further comprising:
   a digital/analog converter unit for digital/analog conversion of the second digitized signals of the digital signal processing unit into analog signals; and
   a transmitting unit for wirelessly transmitting the output signals of the digital/analog converter unit.

7. The transmitter according to claim 3, further comprising:
   a digital/analog converter unit for digital/analog conversion of the second digitized signals of the digital signal processing unit into analog signals; and
   a transmitting unit for wirelessly transmitting the output signals of the digital/analog converter unit.

8. The transmitter according to claim 5, further comprising:
   a digital/analog converter unit for digital/analog conversion of the second digitized signals of the digital signal processing unit into analog signals; and
   a transmitting unit for wirelessly transmitting the output signals of the digital/analog converter unit.

9. The receiver according to claim 2, further comprising:
   a receiving unit for receiving wirelessly transmitted analog high frequency signals;
   an intermediate frequency unit for mixing the high frequency signals onto intermediate frequency signals;
   an analog/digital converter unit for analog/digital conversion of the wirelessly received signals to obtain the first digitized signal for the digital signal processing unit.

10. The receiver according to claim 4, further comprising:
    a receiving unit for receiving wirelessly transmitted analog high frequency signals;
    an intermediate frequency unit for mixing the high frequency signals onto intermediate frequency signals;
    an analog/digital converter unit for analog/digital conversion of the wirelessly received signals to obtain the first digitized signal for the digital signal processing unit.

* * * * *